(12) United States Patent
Gehrmann

(10) Patent No.: US 6,912,657 B2
(45) Date of Patent: Jun. 28, 2005

(54) METHOD AND ARRANGEMENT IN A COMMUNICATION NETWORK

(75) Inventor: Christian Gehrmann, Lund (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 829 days.

(21) Appl. No.: 09/789,230

(22) Filed: Feb. 20, 2001

(65) Prior Publication Data

US 2001/0016909 A1 Aug. 23, 2001

(30) Foreign Application Priority Data

Feb. 22, 2000 (EP) ............................................ 00850032

(51) Int. Cl.[7] ................................................ G06F 1/26
(52) U.S. Cl. ...................... 713/171; 713/200; 713/201; 380/283; 380/285; 380/278
(58) Field of Search ................. 380/283, 285, 380/278; 713/171, 200, 201

(56) References Cited

U.S. PATENT DOCUMENTS

| 4,814,979 A | * | 3/1989 | Neches ........................ 718/106 |
| 5,764,772 A | * | 6/1998 | Kaufman et al. .............. 380/30 |
| 5,818,937 A | | 10/1998 | Watson ........................ 380/25 |

FOREIGN PATENT DOCUMENTS

| EP | 0 802 654 A2 | 10/1997 |
| EP | 0 977 397 A2 | 2/2000 |

OTHER PUBLICATIONS

International Search Report as Completed on Aug. 1, 2001, by the ISA/EP in connection with PCT/EP01/01674.

* cited by examiner

*Primary Examiner*—Thomas R. Peeso

(57) ABSTRACT

The present invention relates to the problem of establishing of security that arises within an ad hoc network The problem is solved by using an optical device at a first device to read a public key that is encoded to a graphical string at a second device, which key is required for establishing security.

10 Claims, 3 Drawing Sheets

METHOD AND ARRANGEMENT IN A COMMUNICATION NETWORK

FIELD OF INVENTION

The present invention relates to the field of communication networks and more specifically to an ad hoc communication network and a method for establishing a security association in an ad hoc network.

DESCRIPTION OF RELATED ART

The fast growth of open networks with easy access has raised many security problems. Several security solutions for public networks like the Internet have appeared. Security is a problem in all kinds of open networks both wired and wireless. Information transmitted over the air is extremely vulnerable. Security solutions can be based on pure symmetric key techniques or can be a combination of symmetric and asymmetric, so-called public key techniques. Common solutions today are built upon some type of so called Public Key Infrastructure (PKI). A public key infrastructure is a system used to distribute and check public keys that can be used to authenticate users, exchange session keys, sign information or encrypt information.

A symmetric key establishing scheme is built on that some a priori secret is known by the involved parties in advance. In principle there are two types of systems, key establishment between two parties sharing a common secret and key establishment by using a third party, a Key Distribution Center (KDC). A typical requirement in any security application is performing mutual authentication and key exchange. If the two involved parties, like in the first system, are pre-configured with a common shared secret this can be obtained by using a standard symmetric key authentication and key exchange protocol.

A well-known example of the latter system is the Kerberos protocol. A Keberos system is shown in a schematic block diagram in FIG. 1. A Keberos system includes a central authentication server, the KDC 101 and several clients 102 and servers 103 whereof only one client 102 and one server 103 is depicted in FIG. 1. When a client 102 in the network wants to exchange secure information with a server 103 in the network, a protocol that involves communication with the KDC 101 according to the following steps:

- 104. The client 102 sends a request including random number to the KDC 101.
- 105. The KDC 101 replies to the client 102 with encrypted session key
- 106. The client 102 sends the encrypted session key and authenticator to the server 103.
- 107. The server 103 replies to the client 102 with an authenticator. This step is an optional step.

The advantage with a system like the Kerberos system compared to mutual exchange is that each entity only needs to share one long lived key with the KDC. There is no need to share keys with all parties in the network. The only entity that needs to store several long-lived keys is the KDC.

In a PKI system, two corresponding (also called asymmetric) keys are used in connection with protecting information. Information, which is encrypted with one of the two keys, can be decrypted only with the other key. In some PKI systems either of the two keys can be used to encrypt and the other to decrypt. In other systems, one key must be used only for encryption and the other for decryption. One important feature of PKI systems is that it is computationally unfeasible to use knowledge of one of the keys to deduce the other key. In a typical PKI system, each of the systems possesses a set of two such keys. One of the keys is maintained private while the other is freely published. If a sender encrypts a message with the recipient's public key, only the intended recipient can decrypt the message, since only the recipient is in possession of the private key corresponding to the published public key. If the sender, before performing the above encryption, first encrypts the message with the senders private key, the recipient, upon performing first a decryption, using the recipient's private key, then a decryption on the result, using the sender's public key, is assured not only of privacy but of authentication since only the sender could have encrypted a message such that the sender's public key successfully decrypts it. In one digital signature scheme, one-way hash is first applied to a message and the hash of the message is encrypted with the sender's private key.

A PKI distributes one or several public keys and determine whether a certain public key can be trusted for certain usage or not. A piece of digitally signed information is often called a certificate. Certificates are the basis upon which PKIs are built.

The degree of confidence that the recipient has in the source of a message depends on the degree of the recipient's confidence that the sender's public key corresponds to a private key that was possessed only by the sender. In many current systems, a number of generally well trusted certification authorities have been established to provide this degree of confidence.

A common certificate format is Standard X.509 (developed by the International Standards Organisation (ISO) and the Comité Consultatif Internationale Telegraphique et Telephonique (CCITT)). Such a certificate may, e.g., include a public key, the name of subject who possesses or is associated with the public key, an expiration date, all of which are digitally signed by a trusted party. The digital signature may be provided e.g., according to the digital signature standard (DSS) (National Institute of Standards and Technology (NIST)). Typically a digital signature involves applying a one-way hash and then encrypting with the private key of, in this case, the certification authority. Such digital signature is provided using the private key of the trusted party which, in turn, is authenticated using the trusted party's certificate signed by yet another trusted party, so that there may be a multi-level hierarchy of trusted parties.

Another certificate format is Pretty Good Privacy (PGP) developed by P. Zimmermann and described in Internet Engineering Task Force (IETF) Open PGP Specification. PGP provides a way to encrypt and decrypt, sign data and exchange keys. Thus it is more than just a PKI. However, the main idea with PGP is that no strict PKI is needed. Instead the PGP users themselves create and extend the PKI they need. This is done by certifying other users public keys, i.e., signing trusted public keys with their own secret key. In this way a "web of trust" is created. A particular key may have several different user IDs. Typically a user ID is an email address. If a revocation signature follows a key, the key is revoked. A user certifies another users key by signing it with one of the keys of his own, which has signing capability. When signing another key, different trust levels can be set, i.e., the amount of confidence the signer has in the signed key and user ID.

Today, so-called ad hoc networks are used more and more frequently. An ad hoc network is established temporary for a special purpose. There is no fixed infrastructure; the nodes are the network. The nodes within the network are often mobile and using radio links. An ad hoc network might constitute dynamic wide area connectivity in situations such as military operations, rescue and recovery operations, and remote construction sites. An ad hoc network might also constitute local area connectivity in situations such as temporary conference sites, home networks and robot networks. An ad hoc network might also constitute personal area networks in situations such as interconnected accessories, ad hoc conference table and games. The nodes might consist of e.g. mobile phones, lap tops, television sets, washing machines In some situations like in military operations or business conferences when the communication between the nodes comprises secrets, it is very important that a sender of a message can trust that the receiver really is the intended receiver.

In the previous examples, bindings between public keys and names or authorisation are described. Several of these certificate solutions exist in different systems. However, it is not yet described how different certificates needed for different kinds of purposes are obtained. In the case of ordinary X.509 type of PKI with hierarchical Certificate Authority (CA) structures, finding the right certificate is done using some central on-line server or by direct transmission of the certificate at connection set up. When using PGP either the desired public key is stored locally on a machine or the device has to make a connection to a central PGP server in order to find the desired pubic key. This works if it is possible for entities that need some type of security relation to have on-line connections to some particular servers. This is not the case for ad hoc networks. Ad hoc networks are created on the fly between entities that happen to be at the same physical location.

Although all the security techniques described earlier are very powerful and allow smooth and automatic security for many different use cases, they all have some problem when it comes to the special situation of human faces in an ad hoc network.

Three different ad hoc scenarios will illustrate the shortcomings of the related art described above regarding ad hoc security establishment.

In the first scenario several people gather together in a conference room and would like to share some information. Everybody in the conference room has a communication unit such as a laptop or a Personal Data Assistant (PDA) with wireless access to all the other people in the room. The people in the room have not been in contact with each other previously. Now they would like to share some secret information using a certain application in their device. How can this be achieved?

In the second scenario, a person arrives at a new geographical location and comes to some vendor machine offering him or her some type of service, e.g. like a ticket or some food. The person has a paying device with a wireless connection to the vendor machine. The company and the person have no previous relation to each other. How can a person transmit an electronic paying transaction (and thereby receive some product from the machine) to the vendor machine over the air interface?

Two different devices, e.g. a mouse and a Personal Computer (PC), from two different vendors are connected to each other over a wireless link, in the third scenario. A person would like to "pair" these two devices so that they can communicate securely over the wireless link How can this be done in a user friendly and efficient way?

The symmetric key based key sharing mechanisms described above, all demands that some secret information is shared between the devices that want to communicate. At least there must be a secure chain like in Kerberos system that can be used to create a trust relation between two devices. A secure chain is e.g. when A and B do not trust each other, but A and C trust each other, and B and C trust each other so A and B can get a trust relationship via C. This is often hard to achieve for the first and second ad hoc scenario. Anyway, it would be very cumbersome to manually enter some secret information to all devices in the first scenario. In the third scenario it would be possible to enter some secret symmetric information into the two devices that the person would like to "pair" This is for example what is used in the security solution of the Bluetooth standard. However that means that if the device has no input channel, e.g. a mouse, a microphone etc., it must be pre configured with the secret information and this information must be kept secret Otherwise, anybody can make a pairing of the device. Furthermore, if the security level should be kept, the secret key of some certain device must be kept physically apart from the device. It is hard for humans to remember several Personal Identification Number (PIN) codes or to store them in a good and secure way.

A public key based system like the ones described above do not fit well into any of the scenarios described. If it should be possible to use a X.509 like certificate or a PGP key, a trusted party must sign the public key. In the first and second scenario it is not always assumed that the parties share trusted public keys or have certificates signed by a third party that each party trust Also in the third scenario, certificates and public keys can not be used without some trust in the signature of the certificate or a public key and since the devices can come from any source it might be very hard to administrate distribution of trusted certificates to all possible devices.

Therefore, what is further needed is a way of making communications within an ad hoc network more secure.

SUMMARY OF THE INVENTION

The present invention relates to the requirement of security in an ad hoc network More particularly it relates to the problem of establishing of security that arises within an ad hoc network.

The problems discussed are:

The symmetric key based key sharing mechanisms described above, all demands that some secret information is shared between the devices that want to communicate. This is often hard to achieve in ad hoc networks.

A public key based system like the ones described above do not fit well into ad hoc networks, since a trusted party must sign the public key. It is unusual that the parties in an ad hoc network share trusted public keys or have certificates signed by a third party that each party trust.

Accordingly, it is an object of the present invention to unravel the above-mentioned problem.

The solution, according to the invention is to use an optical device to read a public key that is encoded to a graphical string, which key is required for establishing security.

An ad hoc communications network according to the invention includes a first device and a second device. These devices are communication devices, which might be a laptop, a mobile phone, a printer, a vendor machine etc. The first device is equipped with an optical device. The second device has a pair of keys, the key pair constituting a secret key and a public key. The public key is hashed to a bit string which bit string is encoded to a graphical string. The graphical string is visible for the user of the first device. The first device has a user, e.g. the owner of the first device that trusts the second device. The first device wishes to authenticate the second device. The first device has means for reading the graphical string by means of the optical device and means for authenticating the second device by means of the read string including the public key. An ad hoc communications network according to this first aspect of the invention is hereby characterised by what are the features of claim 1.

A method for establishing a security relation between a first device and a second device within an ad hoc communications network according to a second aspect of the invention, includes the steps of:

hashing the public key to a bit string;
encoding the bit string to a graphical string;
making the graphical string visible for the user of the first device,
the first device obtaining the graphical string by means of the optical device, and
the first device authenticating the second device by means of the obtained graphical string.

A method according to this second aspect of the invention is hereby characterised by what are the features of claim 6.

An advantage of the present invention is that it is possible to achieve the necessary security associations needed for distributing and sharing information among a group of users that happens to be at the same physical location. There are a large amount of applications that fits in to this scenario. Among those can be mentioned people from different companies or organisations that gather in a conference room can share documents with the meeting members.

Another advantage of the present invention is that the number of manually created trust relations between members in an ad hoc communication network is decreased.

Yet another advantage of the present invention is that it makes it possible "pairing" devices in a secure way also in the case of a device lacking input channel Yet another advantage of the present invention is that since the user physically interacts with the other device to get the trusted key, it is easier for the user to decide whether to trust a device or not.

Yet another advantage of the present invention is that due to the simplicity of the solution, also people without much understanding of the rather complicated mathematics or principles of public keys, can make secure connections with their devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 shows a schematic block diagram of Keberos system.

DESCRIPTION OF PREFFERED EMBODIMENTS

The ad hoc communications network according to the invention constitutes e.g. a bluetooth network or a Wireless Local Area Network (WLAN). The ad hoc network comprises devices constituting e.g. Personal Data Assistants PDAs, lap tops, mice, mobile phones, vendor machines, paying devices, etc. each device comprising communication means. The devices are interconnected via communication links.

Figure 1:
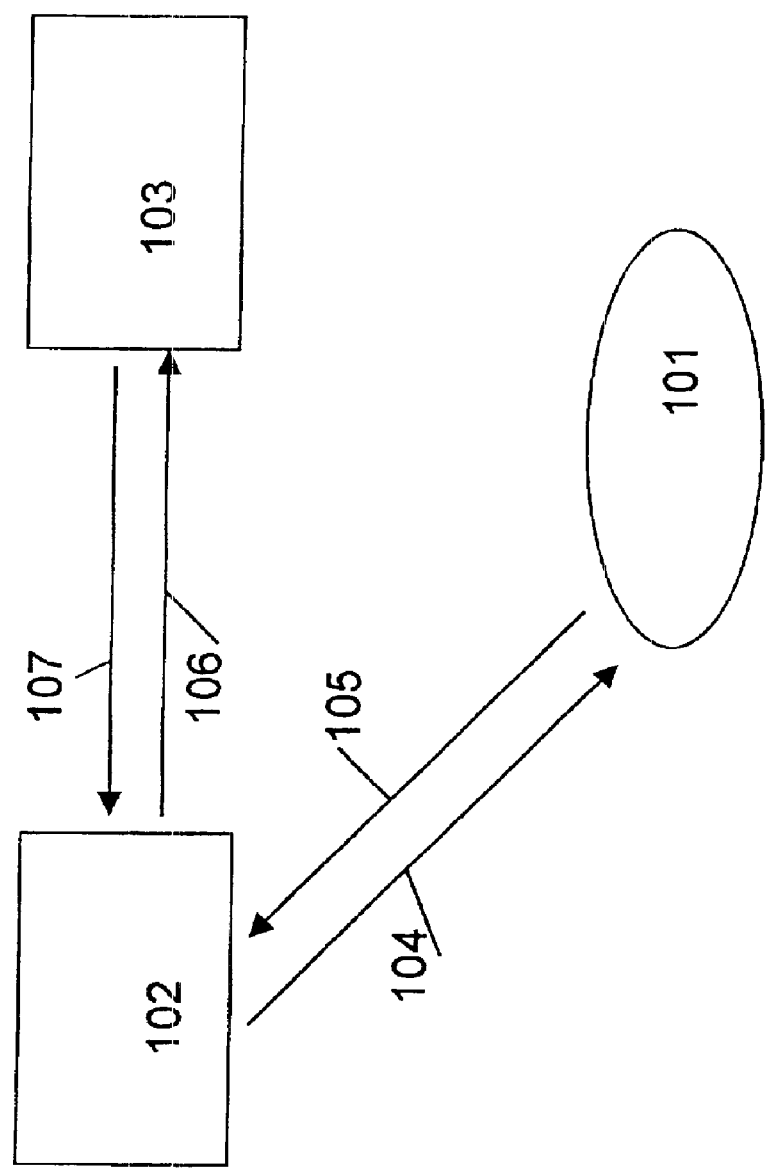
FIG. 1 relates to Prior Art and is thus described above under "Description of related art".
Figure 2:
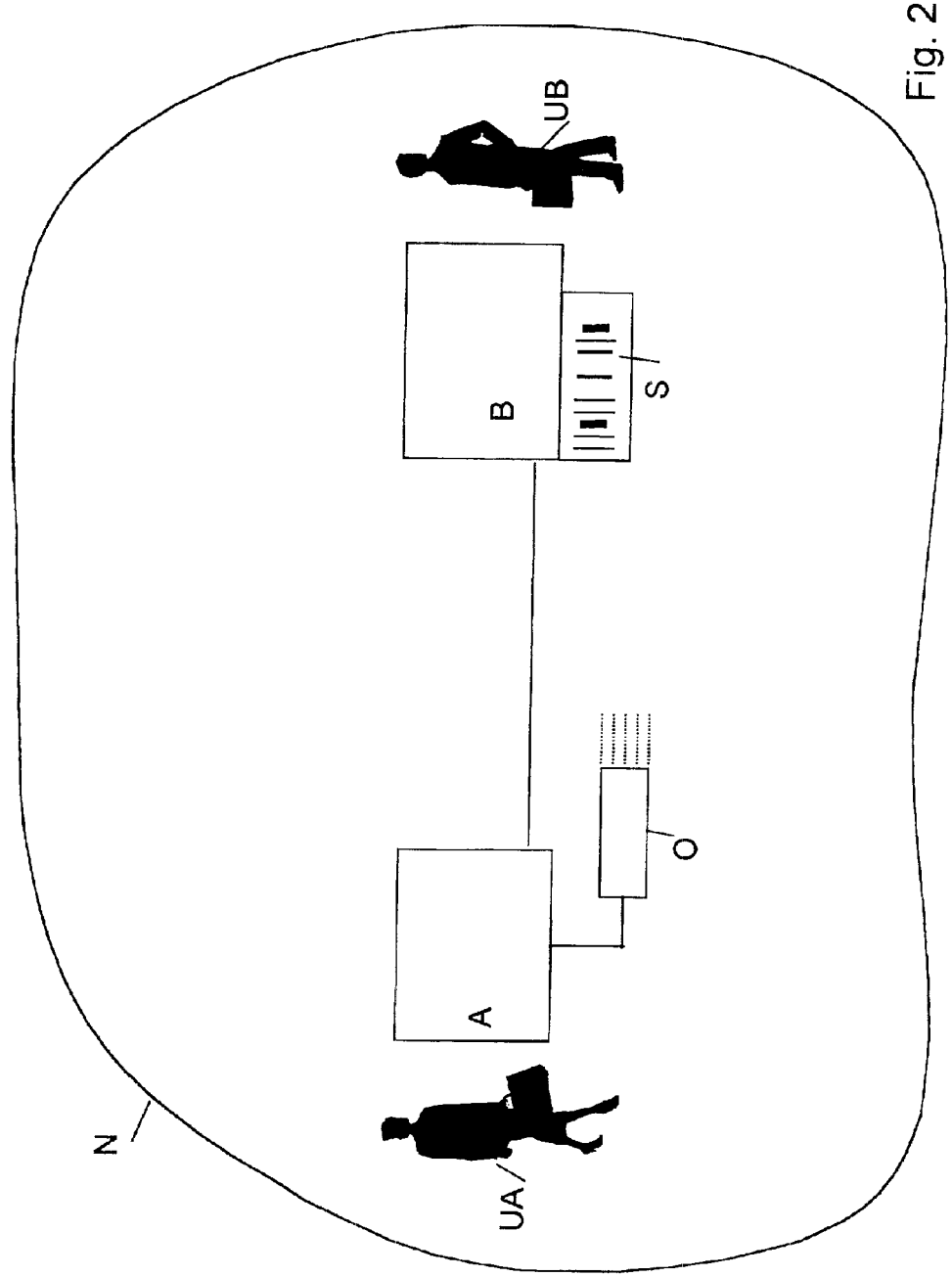
FIG. 2 shows a schematic block diagram of an ad hoc communications network according to the invention.

FIG. 2 shows a possible scenario of an ad hoc communications network N according to the invention. The network N comprises a first device A with wireless access to other devices within the network. The first device A might be e.g. laptop. The first device A is connected to an optical device O over a secured channel. The Optical device O reads information optically, i.e. code or text on paper or on an electronic slip, e.g. a LCD display. An example of such device is a so-called C Pen™.

The first device A also has a person that uses it, a user UA, e.g. the owner of the device.

The user UA wishes to communicate with a second device B within the network N. The second device B has a wireless access to other devices within the network and it might be e.g. a laptop, a vendor machine, a service device etc. The second device B might also have a user UB or might not, as in the case of constituting a vendor machine or a service device. The second device B has one or several secret key-public key pairs. The public key might be contained in a certificate signed by a third party. The public key or certificate that an arbitrary device would like to use to authenticate itself towards the second device B and /or exchange keys, is hashed, using a cryptographic strong one-way-function (see A. J. Menzes, P. C. van Orschot and S. A. Vanstone, *Handbook of Applied Cryptography*, CRC Press, 1997) to a large enough (to provide enough cryptographic strength) bit string. The bit string is mapped by a one-to-one code to a suitable graphical string S, that is readable for the optical device O. The graphical string S in some way visible for the user AU and the first device A, it might be printed on a card carried by the owner or user UB of the second device B, or it might be displayed on a slip, possibly electronic, physically attached to the second device B.

The user UA requires to create a security association between his own first device A and the second device B. The user AU, who trusts the graphical string S, reads the graphical string S with the optical device O. The user UA trusts the graphical string e.g. if it is printed on a card that he got from user UB who he knows or trusts by any other means, or by recognising a trustworthy company trademark of a vendor machine on which the slip, displaying the graphical string, is attached. To simplify for a user to trust a slip displaying a string it can be constructed so that it is easy for a user to see that nobody has manipulated the slip or that there is some electronic protection of the slip that disables the second device B if somebody manipulates the slip.

The read graphical string is transmitted from the optical device O to the first device A in a secure way, if they are in different entities.

The first device A gets the graphical string. If later the device receives a public key or a certificate containing the public key that can be hashed to the string S, that public key or certificate will be treated as trusted.

The first device A contacts the second device B and performs the security protocol. The security protocol used for authentication and shared key generation can be of any standard type like the Transport Layer Security (TLS) handshake protocol or the Internet Key Exchange Protocol (IKE).

The first device A authenticates the second device B using the public key that S is a graphical string of If the second device B is able to proof that it holds a secret key corresponding to the public key that S is a graphical string of, the second device B is trusted by the first device A.

It is possible for the user UA to decide for how long and to what extend a public key corresponding to the graphical string should be trusted. In many situations this trust relation might last for a very short time period.

In another example, both the first and the second devices A and B have a respective optical device and a respective key pair encoded into a respective graphical string being visible. So if the connection between the first device A and the second device B is a mutual trusted connection, The first and the second device A and B exchange secret session keys using trusted public keys.

In an embodiment of the present invention the second device B constitutes a service device which has a network address. The service device C might be a printer, a camera, a projector, a pay machine etc. The first device A which wishes to connect to the service device requires the network address. According to the present invention the graphical string S is mapped to the network address of the service device B. When the first device A reads the graphical string S by means of the optical device O, it obtains the public key, but also the network address of the service device B.

Figure 3:
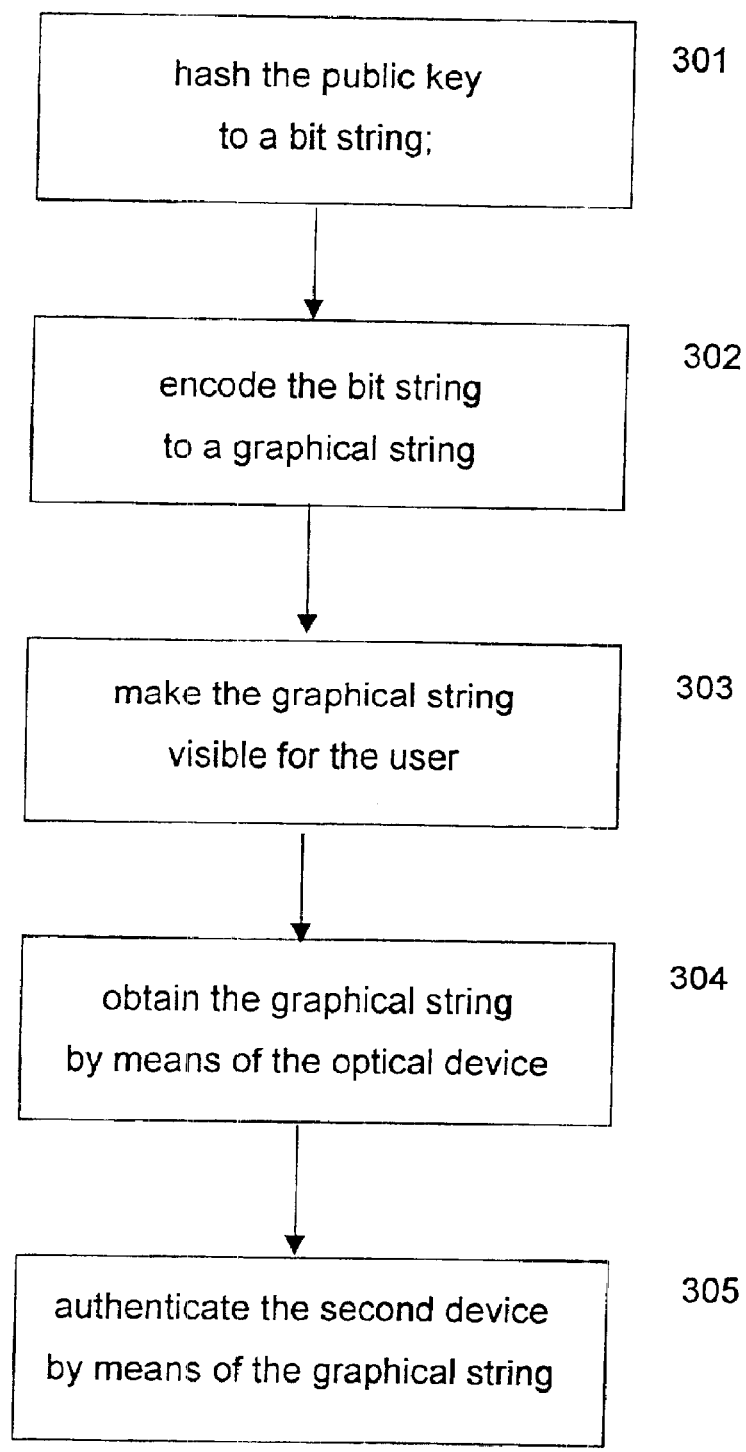
FIG. 3 shows a flowchart of the method according to the invention.

FIG. 3 shows a flowchart of establishing a security relation between a first device and a second device within an ad hoc communications network, according to the invention in a general mode.

The first device having an optical device and the second device having a pair of keys constituting a secret key and a public key.

The first device has a user that trusts the second device.

The method comprises the following steps:

301. The public key is hashed to a bit string.
302. The bit string is encoded to a graphical string.
303. The graphical string is made visible for the user of the first device.
304. The first device obtains the graphical string by reading the visible optical string by means of the optical device.
305. The first device authenticates the second device by means of the obtained graphical string.

What is claimed is:

1. An ad hoc communications network comprising:
   a first device having an optical device; and
   a second device having a pair of keys, the pair of keys comprising a secret key and a public key, the first device having a user that trusts the second device wherein the public key is hashed to a bit string, wherein the bit string is encoded to a graphical string, the graphical string being visible for the user of the first device, the first device having means for obtaining the graphical string by means of the optical device, and the first device having means for authenticating the second device by means of the obtained string.

2. The ad hoc communications network according to claim 1, wherein the first device, after receiving the public key from the second device, trusts the public key if it can be hashed to the graphical string.

3. The ad hoc communications network according to claim 1, wherein the second device comprises a service device having a network address and the graphical string is mapped to the network address.

4. The ad hoc communications network according to claim 3, wherein the first device has means for obtaining the network address, by means of the optical device.

5. The ad hoc communications network according to claim 4, wherein the first device has means for connecting to the service device by means of the obtained network address.

6. Method for establishing a security relation between a first device and a second device within an ad hoc communications network, the first device having an optical device, the second device hiving a pair of keys comprising a secret key and a public key, the first device having a user that trusts the second device, the method comprising the steps of:
   hashing the public key to a bit string;
   encoding the bit string to a graphical string;
   making the graphical string visible for the user of the first device;
   the first device obtaining the graphical string by means of the optical device; and
   the first device authenticating the second device by means of the obtained graphical string.

7. The method according to claim 6, wherein the first device, after receiving a public key from the second device, trusts the public key if it can be hashed to the string.

8. The method according to claim 6, wherein the second device comprises
   a service device having a network address, the method comprising the further step of mapping the graphical string to the network address.

9. The method according to claim 8, comprising the further step to be taken by the first device:
   obtaining the network address by means of the optical device.

10. The method according to claim 9, comprising the further step to be taken by the first device:
    connecting to the service device by means of the obtained network address.

* * * * *

UNITED STATES PATENT AND TRADEMARK OFFICE
CERTIFICATE OF CORRECTION

| | | |
|---|---|---|
| PATENT NO. | : 6,912,657 B2 | Page 1 of 1 |
| APPLICATION NO. | : 09/789230 | |
| DATED | : June 28, 2005 | |
| INVENTOR(S) | : Christian Gehrmann | |

It is certified that error appears in the above-identified patent and that said Letters Patent is hereby corrected as shown below:

In Column 8, Line 25, in Claim 6, after "second device" delete "hiving" and insert -- having --, therefor.

In Column 8, Line 43, in Claim 8, after "step of" insert -- : --.

In Column 8, Line 43, in Claim 8, delete "mapping the graphical" and insert -- mapping the graphical -- in Line 44 before "string to the network address".

In Column 8, Line 48, in Claim 9, after "address" insert -- , --.

Signed and Sealed this

Twentieth Day of November, 2007

JON W. DUDAS
*Director of the United States Patent and Trademark Office*